Patented Dec. 31, 1929

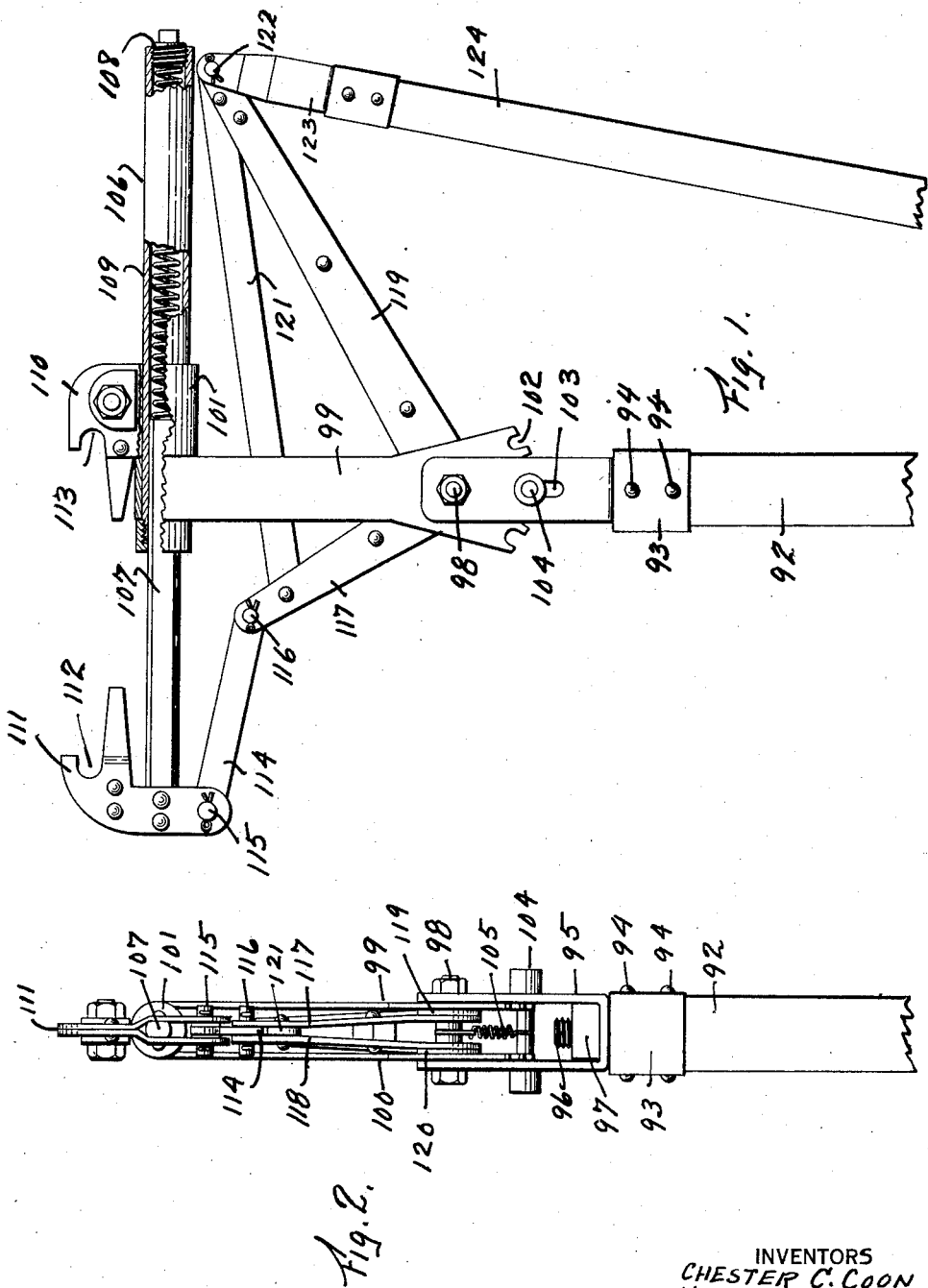

1,741,288

UNITED STATES PATENT OFFICE

CHESTER C. COON AND HERBERT H. MINOR, OF FRESNO, CALIFORNIA; SAID MINOR ASSIGNOR TO SAID COON

COME-ALONG-OPERATING DEVICE

Application filed July 20, 1925. Serial No. 44,784.

Our invention relates to comealong operating devices for use by linemen in handling hot wires, and more particularly for changing or installing new insulators in a dead end.

Heretofore it has been customary, and necessary, when replacing a broken insulator on the dead end of a power line, to shut off the power or current while the insulators are replaced, resulting in a considerable inconvenience to the consumers and the consequent loss of revenue to the company.

It is the object of our invention to provide a comealong operating device by the use of which the insulators may be changed or replaced while the wire is hot, thus avoiding the necessity for shutting off the power, with a minimum of time and labor, and which may easily and quickly be adjusted into position for use and removed after being used.

Another object is to provide a device of the above character which will be simple in construction and operation and which may be operated with a minimum amount of danger to the linemen.

Other objects and advantages will appear hereinafter and, while we have shown and will describe the preferred form of our invention, we wish it to be understood that we do not limit ourselves to such preferred form, but that various changes and adaptations may be made therein without departing from the spirit of our invention.

Our device comprises a gripper member or "comealong".

In the drawings accompanying and forming a part hereof:

Fig. 1 is a side elevation of a comealong operating device.

Fig. 2 is a left hand elevation of Fig. 1.

The comealong operating device comprises a stick or handle 92 of wood, or other suitable insulating material, the upper end of which is surrounded by a ferrule 93, held positioned by rivets 94. Mounted upon the upper end of handle 92 is a substantially U-shaped bracket 95 held positioned by a stud 96 and nut 97. The free ends of bracket 95 extend upwardly, and pivotally supported between these upper ends, by means of a pivot 98, are upwardly extending arms 99 and 100 the upper ends of which arms carry a cylindrical body member 101. The other ends of arms 99 and 100 extend downwardly from pivot 98 and are widened, and in these widened ends are provided a plurality of registering recesses 102. Provided in the upstanding legs of member 95, intermediate their ends, are slots 103 in which is slidably mounted a stud 104 adapted to be received in the recesses 102 of member 99. A coil spring 105 has one end secured to pivot 98 and the other end connected to stud 104 and serves to hold stud 104 within one of the recesses 102. Rigidly mounted at one end within body 101 is a cylindrical member 106 within one end of which is slidably mounted one end of a piston 107. The other end of member 106 is closed by a screwthreaded member 108. Mounted within member 106, between the inner end of piston 107 and the inner end of member 108, is a coil spring 109 the function of which is to hold member 107 at its outermost position. Extending upwardly from member 101 is a hook member 110 and rigidly secured upon the free end of member 107 is a similar hook member 111. Members 110 and 111 are provided near their upper ends with opposed recesses 112 and 113. Member 111 extends downwardly from member 107 and is bifurcated and in this bifurcated end is pivotally mounted one end of a link 114 by means of pivot 115. The other end of link 114 is pivotally mounted by means of pivot 116 between the ends of links 117 and 118 forming a toggle. The other ends of links 117 and 118 are pivotally mounted upon pivot 98. Pivotally mounted upon member 98, on the inner sides of plates 99 and 100 are the lower ends of link members 119 and 120, the other ends of which link members extend upwardly and terminate near the free ends of cylinder 106. The outer ends of members 119 and 120 and 117 and 118 are rigidly connected by a bar 121. Pivotally mounted at its upper end by a pivot 122 is a yoke 123 thus forming a bell-crank like element. Yoke 123 is substantially U-shaped and has its lower end connected to a stick 124 in a similar manner to member 95.

In the operation of our comealong operating device, we will describe the same as being used in installing a new insulator on the dead end of a hot wire. First, the usual comealong will be inserted in the comealong operating device. The comealong used in the present case must be preferably provided with members to coact with the members 110 and 111, which may be accomplished by protrusions conforming to the shape of the recesses 112 and 113 in the respective jaws. When the comealong device is positioned in the operating device, the operating device is in the open position shown in Figure 1. Then by moving the stick 124 downwardly, the link member 119 will be turned thereby around the fulcrum or pivot point 98. At the same time, the rigid connecting bar 121 will exert a force upon the link members 117 and 118, thereby forcing the jaw 111 toward the jaw 118. It is to be noted that during the movement of the jaw 111, the piston 107 slides in the cylindrical member 106 against the action of the coil spring 109.

The comealong device to be used in connection with my device is preferably of a resiliently gripping device so that by the drawing of the jaw 111 toward the jaw 110, the comealong device is opened. Thus, the downward movement of the stick 124 and the movement of the jaws toward each other compresses the comealong and moves the same into its open position. Then the comealong will be positioned upon the wire to be gripped in the desired location by means of the manipulation of the handle 92 of the device. The operating device is released by the upward movement of the stick 124 with the assistance of the spring 109, forcing the jaw 111 away from the jaw 110. The releasing of the operating device will cause the wires to be gripped tightly in the comealong.

In order to remove the comealong from the wire, the jaws are drawn toward each other in the manner heretofore described, thereby disengaging the comealong from the wire for removing the same. It is to be noted that the jaws may be used for direct gripping of any article or object used in connection with hot wire installations or the like. Naturally, the device maintains the comealong in a gripping position until the work on the hot wire is completed by suitable tools.

In order to render the operation of the operating device more positive and more convenient in any position that may be required in accordance with the disposal of the hot wire to be worked on, the upwardly extending arms 99 and 100 may be adjusted to various angular positions relative to the bracket 95. The adjustment merely involves the disengagement of the stud 104 from the recess 102; then the turning of the arms 99 and 100 into the required angular position. Now, by releasing the stud 104, the action of the spring 105 will draw the same into coacting position with the adjacent recess 102, thereby maintaining the arms 99 and 100 in the adjusted angular position.

Having described our invention, what we claim is:

1. An operating device of the character described, comprising a pair of coacting jaws, supporting elements for the same arranged one slidable relative to the other, a long handle extending transversely from one of the elements, a link extending from said handle having a second handle pivoted to the free end thereof, and an operative connection between said free end and the second element allowing the second jaw to be urged toward the first jaw by manipulation of the second handle.

2. An operating device of the character described, comprising a pair of coacting jaws, supporting elements for the same arranged one slidable relative to the other, a long handle extending transversely from one of the elements, a link extending from the handle having a second handle pivoted to the free end thereof, a second link extending from the handle, a third link connecting the second link with the second supporting element and a fourth link connecting the second link with the free end of the first link and allowing the second jaw to be urged toward the first jaw by manipulation of the second handle.

3. A device of the character described comprising a supporting member, a cylinder pivotally related to the supporting member, a stationary clamping jaw carried by the cylinder, a piston having a cooperating clamping jaw carried thereby and spaced from the fixed jaw and means for moving the cooperating clamping jaw into clamping relation with the fixed jaw.

4. A device of the character described comprising a supporting member, a cylinder pivotally related to the supporting member, a stationary clamping jaw carried by the cylinder, a spring actuated piston within the cylinder, a cooperating jaw carried by the piston and means for moving the cooperating clamping jaw into clamping relation with the fixed jaw.

5. A device of the character described comprising a support, a cylinder pivotally related to the support, a stationary clamping jaw affixed to the cylinder, a spring actuated piston within the cylinder and having a cooperating clamping jaw at its outer end and toggle means for moving the cooperating clamping jaw into clamping relation with the fixed jaw.

6. A device of the character described comprising a support, a cylinder pivotally related to the support, a stationary clamping jaw affixed to the cylinder, a spring actuated piston within the cylinder and having a cooperating clamping jaw at its outer end, toggle means for moving the cooperating clamping jaw into clamping relation with the fixed jaw and a link and lever for operating the toggle.

7. A device of the character described comprising a support, a cylinder pivotally related to the support, a stationary clamping jaw affixed to the cylinder, a spring actuated piston within the cylinder and having a cooperating clamping jaw at its outer end, toggle means for moving the cooperating clamping jaw into clamping relation with the fixed jaw, a bell crank element and instrumentalities for rocking the bell crank for moving the toggle.

8. In a device of the character described comprising a supporting handle, a U-shaped bracket affixed to the handle, spaced apart arms pivotally related to the bracket, said arms forming an arcuate rack at their lower extremities, a cylinder affixed to the upper ends of the arms and lying transversely thereof, a spring actuated piston within the cylinder and capable of longitudinal movement therein, a gripping jaw affixed to the outer end of the piston, a complementary jaw affixed to the cylinder, spaced apart toggles having one of their ends pivotally related to the jaw at the end of the piston, the other of their ends pivoted within the bracket, spaced apart arms pivotally related within the bracket at one of their ends, a bar connected at one of its ends to the toggles and at the other of its ends to the other end of the first named arms and means for rotating the spaced apart arms about their pivot.

9. In a device of the character described comprising a supporting handle, a U-shaped bracket secured to the handle, spaced apart arms pivotally related within the bracket at their lower ends, a cylinder lying transversely of the spaced apart arms and supported at the other of the ends thereof, a spring actuated piston within the cylinder, a clamping jaw carried by the outer end of the piston, a clamping jaw carried by the cylinder and spaced from the first named jaw, spaced apart toggles pivotally related at one of their ends to the piston jaw and with the U-shaped bracket at the other of their ends within the bracket, spaced apart arms pivotally related at their inner end within the bracket, a link connected at one of its ends to the toggle and to the spaced apart arms at the other of its ends and means for rocking the arms on their pivot member within the bracket.

10. A device of the character described comprising a supporting handle, a U-shaped bracket affixed to the end of the handle and having elongated slots in the sides thereof, a pivot pin passing through the bracket, spaced apart supporting arms forming a toothed sector at their lower ends, pivoted on the pivot pin, a cylinder supported by the supporting arms and lying transversely thereof, a spring actuated piston within the cylinder, a clamping jaw carried by the cylinder and a clamping jaw carried by the outer end of the piston, spaced apart toggles pivotally related at one of their ends to the clamping jaw carried by the piston and pivoted on the pivot pin within the bracket at the other of their ends, spaced apart arms extending upwardly and at an angle to the supporting handle and pivotally related at one of their ends on the pivot pin within the bracket, a link connected to the toggle at one of its ends and to the outwardly extending arms at the other of its ends, a locking pin capable of longitudinal movement within the slots of the bracket and a spring for urging the locking pin toward the pivot pin within the bracket.

11. A device of the character described comprising a supporting handle, a bracket secured to the end of the handle having a pivot pin therein, spaced apart supporting arms pivoted on the pivot adjacent one of their ends, a cylinder supported between the other of the ends of the supporting arms, a closure member for one end of the cylinder, a piston capable of reciprocal movement within the cylinder, a spring intermediate the closure member and the inner end of the piston, a clamping jaw affixed to the cylinder, a cooperating jaw affixed to the outer end of the piston, spaced apart toggles pivotally related at one of their ends to the cooperating jaw and pivoted on the pivot pin within the bracket at the other of their ends, two spaced apart upwardly and outwardly extending arms pivotally related at their inner ends on the pivot within the bracket, a link connected at one of its ends to the toggles and at the other of its ends to the upwardly and outwardly extending arms and means for locking the supporting arms in adjusted relation to the supporting handle.

In witness that we claim the foregoing we have hereunto set our hands this 6th day of July, 1924.

CHESTER C. COON.
HERBERT H. MINOR.